(12) United States Patent
Molnar

(10) Patent No.: US 9,369,168 B2
(45) Date of Patent: Jun. 14, 2016

(54) SECURITY CASE FOR A PORTABLE ELECTRONIC DEVICE

(71) Applicant: Andrew W. Molnar, Vancouver (CA)

(72) Inventor: Andrew W. Molnar, Vancouver (CA)

( * ) Notice: Subject to any disclaimer, the term of this patent is extended or adjusted under 35 U.S.C. 154(b) by 53 days.

(21) Appl. No.: 14/260,158

(22) Filed: Apr. 23, 2014

(65) Prior Publication Data

US 2015/0311938 A1 Oct. 29, 2015

(51) Int. Cl.
| H04M 1/00 | (2006.01) |
| H04B 1/3888 | (2015.01) |
| A45F 5/00 | (2006.01) |
| A45F 5/02 | (2006.01) |
| H04M 1/04 | (2006.01) |

(52) U.S. Cl.
CPC ............ *H04B 1/3888* (2013.01); *A45F 5/00* (2013.01); *A45F 5/004* (2013.01); *A45F 5/021* (2013.01); *H04M 1/04* (2013.01); *A45F 2005/006* (2013.01); *A45F 2200/0516* (2013.01)

(58) Field of Classification Search
USPC ........... 455/575.1, 575.6, 575.8, 550.1, 556.1
See application file for complete search history.

(56) References Cited

U.S. PATENT DOCUMENTS

| 7,354,304 | B2 * | 4/2008 | Livingston | A45F 5/00 439/501 |
| D667,823 | S | 9/2012 | Merenda | |
| 2003/0042348 | A1 | 3/2003 | Salentine et al. | |
| 2007/0035699 | A1 * | 2/2007 | McKee | G03B 17/56 352/90 |
| 2007/0212931 | A1 * | 9/2007 | Livingston | A45F 5/00 439/501 |
| 2011/0278288 | A1 | 11/2011 | Fuller | |
| 2012/0077556 | A1 * | 3/2012 | McKendrick | H04M 1/04 455/575.8 |
| 2013/0278215 | A1 * | 10/2013 | Dea | H02J 7/0044 320/111 |
| 2015/0076183 | A1 * | 3/2015 | Palma | A45F 5/004 224/162 |
| 2015/0250061 | A1 * | 9/2015 | Merenda | H05K 5/0086 224/191 |

* cited by examiner

*Primary Examiner* — Fayyaz Alam
(74) *Attorney, Agent, or Firm* — Cameron IP

(57) ABSTRACT

A security case (20) for a portable electronic device such as a mobile phone (22) to prevent theft and loss. The security case has a case body comprising a panel (24) and side walls (26) configured to hold the phone. An extendible and retractable cord (42) in a spool assembly (36) attached to the case body is lockable against retraction in its extended position. The cord is attachable to an object such as a user's belt loop (66) or to a desk or chair, etc., to tether the case and phone. The phone can be easily and conveniently used while keeping it securely tethered since the cord does not retract until the user presses a rewind button (50).

17 Claims, 4 Drawing Sheets

SECURITY CASE FOR A PORTABLE ELECTRONIC DEVICE

BACKGROUND OF THE INVENTION

The invention pertains to cases for portable electronic devices to protect them against theft and loss.

Portable electronic devices, such as mobile phones (i.e. cell phones and smartphones), tablet computers and personal entertainment devices such as iPods, have become very popular and very compact, leading to many instances of theft and loss. Although protective cases for these devices are in common use, they typically provide protection against mechanical damage due to dropping, abrasion and impact, but no protection against loss, since the cases would simply be lost or stolen with the device.

Salentine et al., US 2003/0042348, discloses a retractable tether for use in conjunction with a personal communication device. The retractable tether has a housing and a mounting mechanism for mounting the tether to the user's body.

There is a need for a means of protecting portable electronic devices against theft and loss while still permitting convenient use of the devices, and without requiring a separate tethering apparatus.

STATEMENT OF INVENTION

According to one aspect, the invention provides a security case for a portable electronic device, comprising a case body configured to hold the portable electronic device and a spool assembly mounted on the case body. The spool assembly comprises a spool with a cord attached thereto, the spool being rotatable between a first position in which the cord is wound onto the spool and a second position in which the cord extends at least partly from the spool, the spool being biased to the first position, the spool being lockable against rotation into the first position, the spool being releasable from the second position, and the cord being attachable to an object separate from the security case and the portable electronic device, such as a user's garment, a bag or a chair.

According to another aspect, the invention provides a security case for a portable electronic device, comprising a case body configured to hold the portable electronic device, a spool mounted on the case body, a cord affixed to the spool, the cord being extendible from the spool and retractable onto the spool, the cord being lockable against retraction in an extended position, the cord being attachable to an object separate from the security case and the portable electronic device.

According to another aspect, the invention provides a security case for a portable electronic device, comprising: a case body; means for detachably affixing the case body to the portable electronic device; a spool assembly mounted on the case body, comprising: a spool with a cord attached thereto, the spool being rotatable between a first position in which the cord is wound onto the spool and a second position in which the cord extends at least partly from the spool; means for biasing the spool to the first position; means for locking the spool against rotation into the first position; means for releasing the spool from the second position; and means for forming a loop of the cord for attachment to an object.

Further aspects of the invention and features of specific embodiments are described below.

DETAILED DESCRIPTION OF THE PREFERRED EMBODIMENTS

Figure 1:
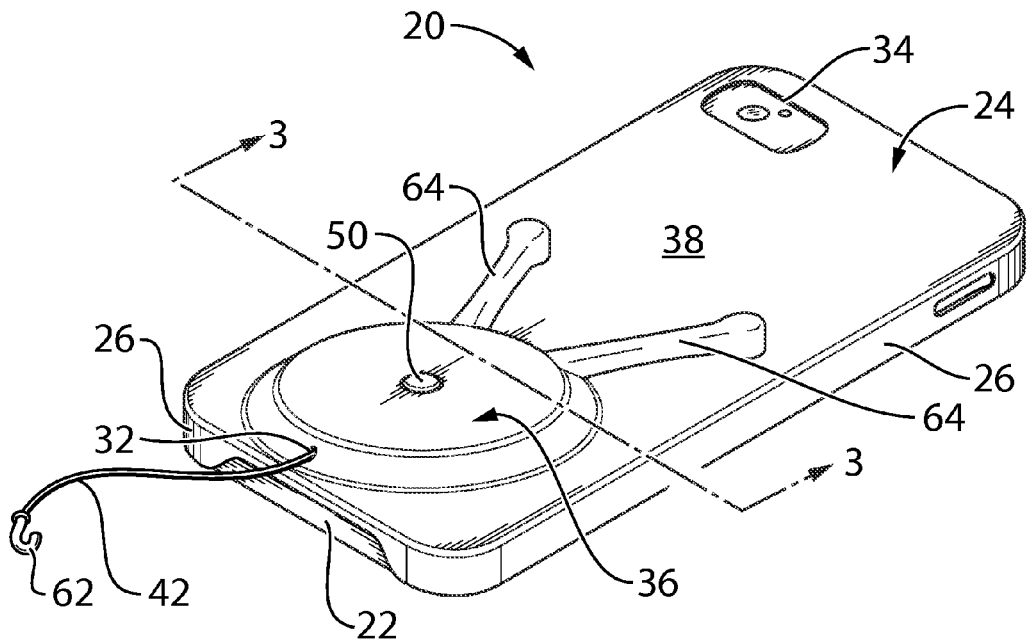
FIG. 1 is a perspective view of an embodiment of the security case of the invention attached to a mobile phone.
Figure 2:
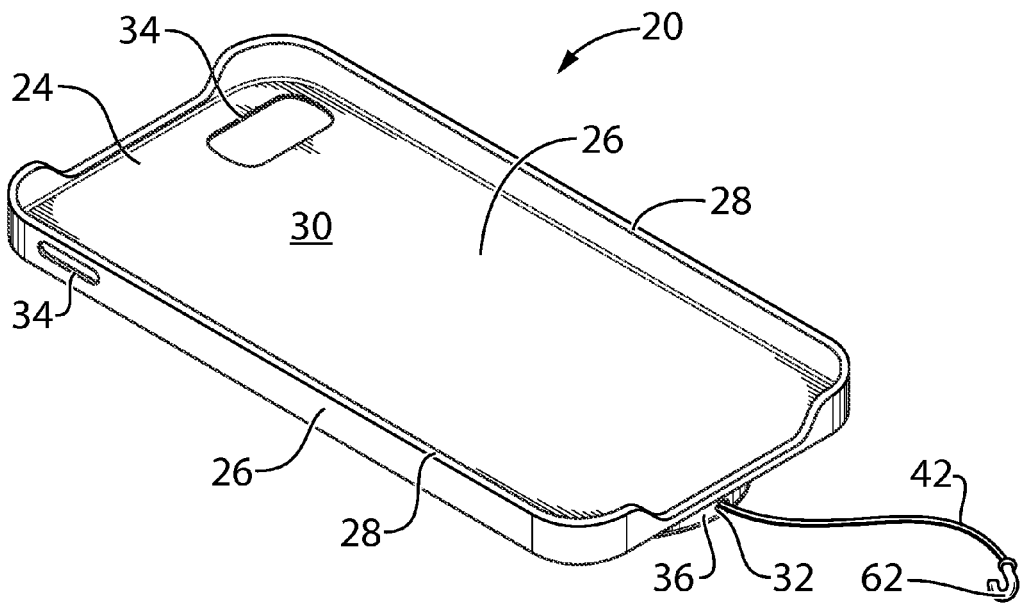
FIG. 2 is another perspective view of the security case of FIG. 1, showing its inner side.

The security case for a portable electronic device is described below with respect to an embodiment in which the case is for a mobile phone, in particular a smartphone. It will be understood that this is only one example of the security cases of the invention. They can be readily configured to attach to other portable electronic devices, including tablet computers and personal entertainment devices such as iPods.

The case 20 for a mobile phone 22 has a case body comprising a generally rectangular panel 24 with side walls 26. The case 20 has openings 34 to provide access to the phone's controls, camera lens and data ports. The side walls are configured to provide means to detachably affix the case to the mobile phone. They extend along the long sides of the panel and at the panel corners, but not along the short sides of the panel. The side walls 26 each have an inwardly-extending lip 28. The distance between the inner face 30 of the panel and the bottom edge of the lips 28 is equal to the thickness of the mobile phone 22, such that the phone fits in the case between the inner face 30 of the panel and the lips 28 and is held in place in the case body by the side walls and the lips, which fit over the edge of the phone with a snap fit. The panel 24 covers the back of the phone and the screen side of the phone is left exposed for use.

The case body is made of a resilient plastic material, permitting the side walls 26 to flex and open sufficiently for the phone to be inserted into the case and to permit removal of the phone from the case. The phone can be removed from the case with moderate effort by the user by bending the side walls outwardly and pushing the phone over the lips.

A spool assembly 36 is located on the outer face 38 of the case panel 24. The spool assembly cover 54 has a low profile, extending about 5 mm above the plane of the outer face 38 of the case panel 24. In order to permit the case to lie horizontally when laid on its spool assembly side, two stabilizer ridges 64 that are the same height as the spool assembly cover are provided on the outer face 38 of the case panel, extending from the spool assembly past the longitudinal midpoint of the case. Since these three elements are the same height, i.e. the spool assembly and the two stabilizer ridges, they hold the case and phone horizontally when laid on a desk or table.

Figure 3:
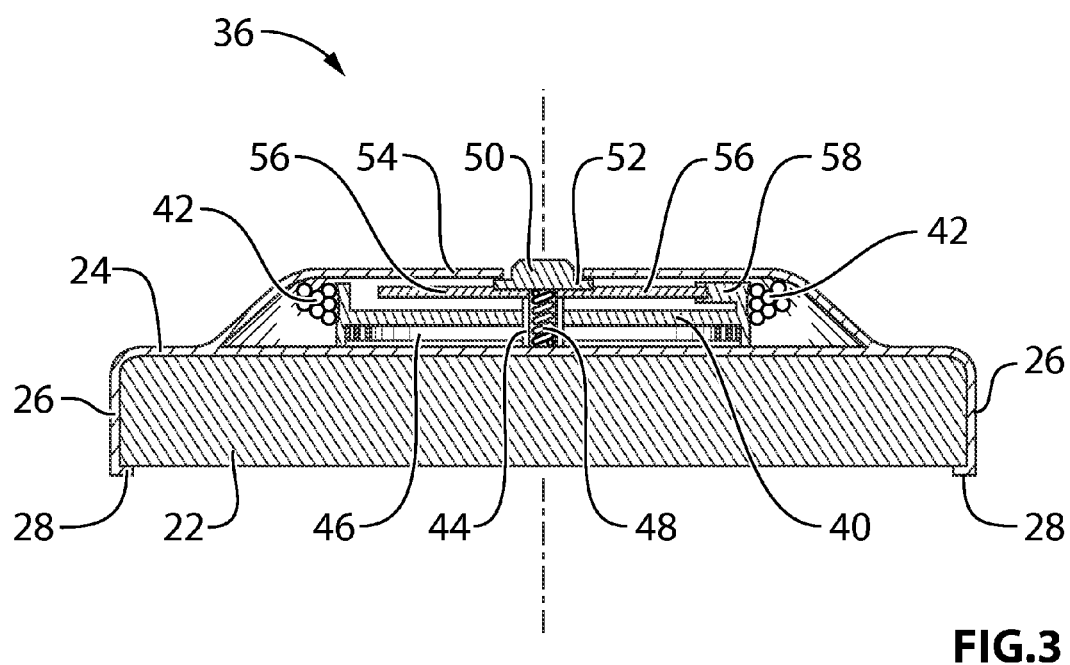
FIG. 3 is a cross-sectional view on the line 3-3 of FIG. 1.

The spool mechanism is of the type that permits a cord to be unwound by pulling on the cord, that automatically locks the unwound cord against retraction onto the spool, and that retracts the cord upon pressing a rewind button. This type of spool mechanism is conventional and is well understood in the art. The spool assembly 36 has a spool 40 to which a cord 42 is securely affixed and around which it is wound, for extension from the spool and retraction back onto the spool. The cord 42 is a strong, flexible wire. A convenient cord length is about 27 inches (68.5 cm). Referring to FIG. 3, the spool 40 is mounted for rotation on a shaft 44 that is affixed to the case panel 24 and is perpendicular to the plane of the case panel. A flat spiral spring 46 is attached to the shaft 44 and to the rotatable spool 40 so as to bias the spool to rotate in the direction in which the cord is fully wound up on the spool. A rewind button 50 is fitted on the shaft 44 for vertical movement but not rotational movement. The shaft 44 has a bore that holds a small compression spring 48 that biases the rewind button 50 upwards. In its upper position, the flanges 52 of the rewind button contact the underside of the spool assembly cover 54 and the rewind button is held in place with the top of the rewind button protruding through an opening in the spool assembly cover 54. The rewind button has bevelled arms 56 that engage with an inclined flange 58 on the upper side of the spool 40. The arms 56 and flange 58 are configured to permit rotation of the spool in the unwinding direction and to prevent rotation of the spool in the wind-up direction. When the unwind button 50 is manually depressed, against the bias of the compression coil spring 48, the arms 56 move to a position below and out of engagement with the flange 58 of the spool, permitting the spool to be rotated by the force of the flat spiral spring 46 and wind up the cord onto the spool.

Figure 4A:
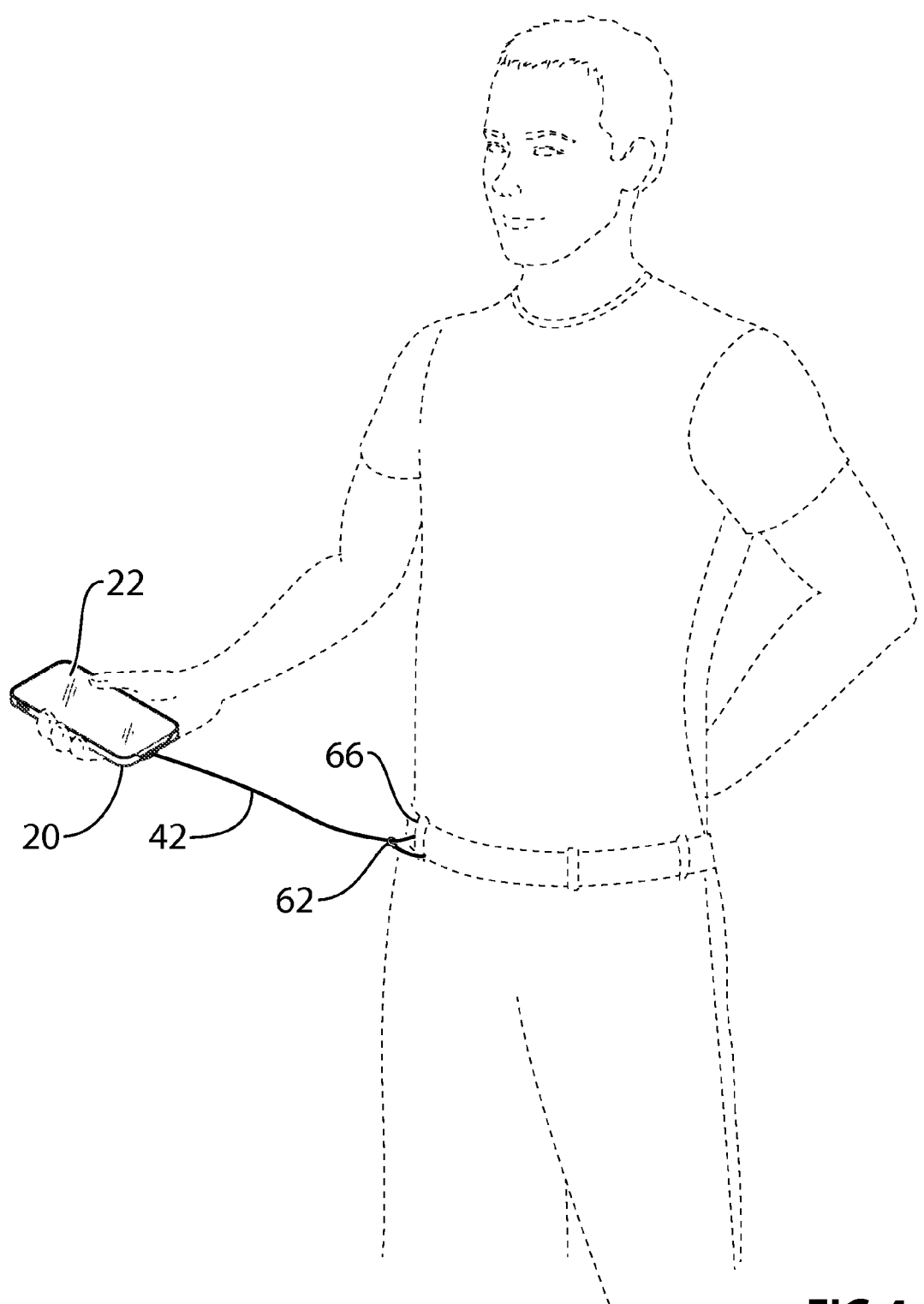
FIG. 4a is a schematic view of the security phone case tethered to a user.
Figure 4B:
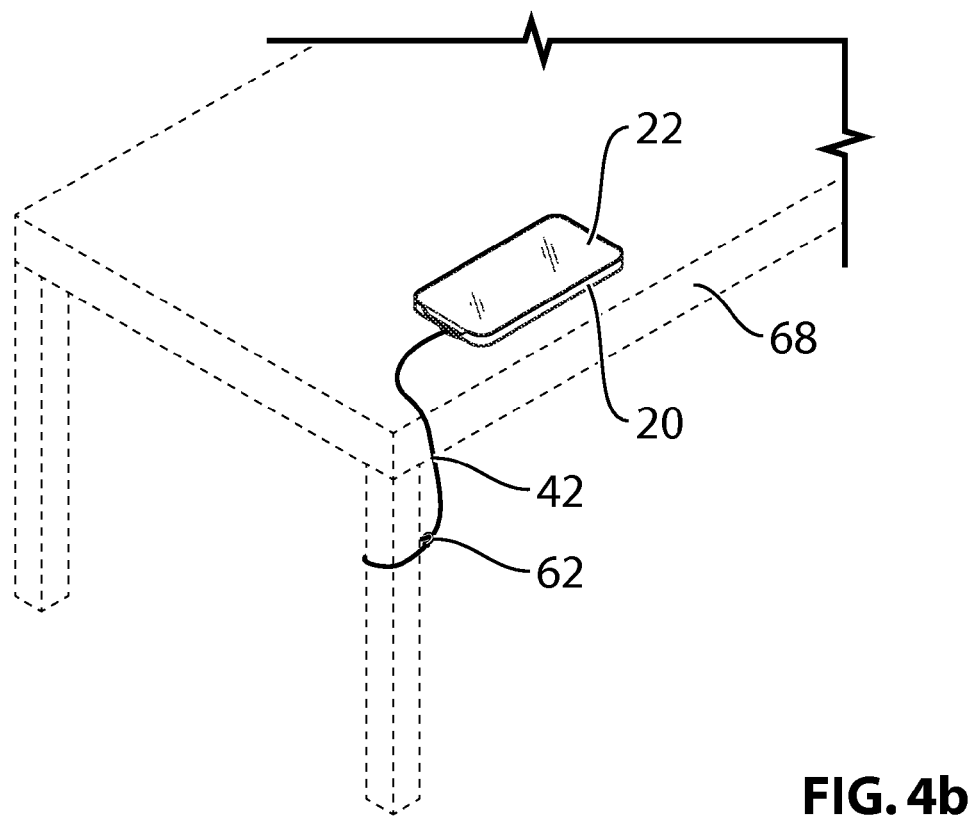
FIG. 4b is a schematic view of the security phone case tethered to a table leg.
Figure 4C:
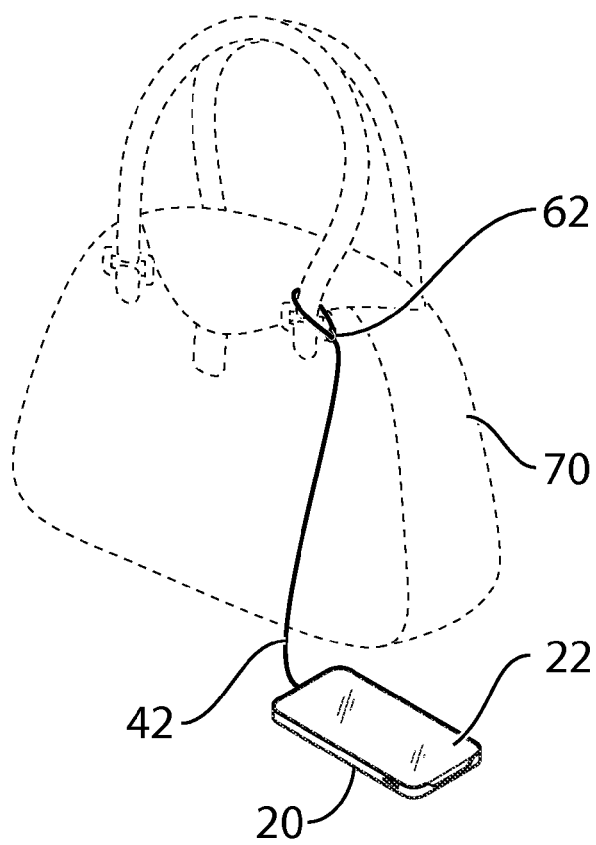
FIG. 4c is a schematic view of the security phone case tethered to a purse or bag.

The cord extends out from the spool assembly through an opening 32 in the spool assembly cover 60. An attachment device such as a hook 62 or clasp is affixed to the free end of the cord. The attachment device is configured to latch onto the cord so as to form a loop, thus permitting the cord to be easily secured to an object such as a user's belt loop 66, to the leg of a table 68 or to a bag or purse 70, as seen in FIGS. 4*a*, 4*b* and 4*c*, or to a belt or other clothing article, to a chair, etc. The case, containing the phone, can thus be tethered to an object to secure the phone against theft or loss. Importantly, since the unwound cord does not retract onto the spool until the user presses the rewind button, the tethered phone can be placed on a desk, etc. in front of a user, or be held by the user, without the spool assembly applying a retractive force to it. This permits the phone to be easily and conveniently used while keeping it securely tethered.

As will be apparent to those skilled in the art in light of the foregoing disclosure, many alterations and modifications are possible in the practice of this invention without departing from the scope thereof. Accordingly, the scope of the invention is to be construed in accordance with the following claims.

The invention claimed is:

1. A security case for a portable electronic device, comprising:
    a) a case body configured to hold the portable electronic device;
    b) a spool assembly mounted on an outer face of the case body, comprising a spool with a cord attached thereto, the spool being rotatable between a first position in which the cord is wound onto the spool and a second position in which the cord extends at least partly from the spool, the spool being biased to the first position, the spool being lockable against rotation into the first position, the spool being releasable from the second position, and the cord being attachable to an object separate from the security case and the portable electronic device;
    c) a spool assembly cover extending outwardly from the outer face of the case body and extending over the spool assembly; and
    d) a pair of projections extending outwardly from the outer face of the case body and extending from the spool assembly cover the projections having the same height as the spool assembly cover so that the security case lies horizontally when laid on the spool assembly cover.

2. A security case according to claim 1, wherein the case body comprises a panel and at least two side walls.

3. A security case according to claim 1, wherein the spool is releasable from the second position by a manually-operated rewind button moveable between a locking position in which the spool is locked against rotation into the first position and a rewinding position in which the spool is released from the second position.

4. A security case according to claim 1, wherein the means for biasing the spool to the first position comprises a spring.

5. A security case according to claim 1, wherein the portable electronic device is a mobile phone.

6. A security case according to claim 1, wherein the portable electronic device is one of a tablet computer and a personal entertainment device.

7. A security case according to claim 2, wherein the side walls are flexible and lips on the flexible side walls are adapted to fit over edges of the portable electronic device and releasably hold the portable electronic device.

8. A security case according to claim 2, wherein the spool is rotatable about an axis that is perpendicular to the plane of the panel.

9. A security case according to claim 2, wherein the spool is rotatable about a shaft affixed to the panel.

10. A security case according to claim 2, wherein the spool is positioned in a space between the panel and the spool assembly cover.

11. A security case for a portable electronic device, comprising:
    a) a case body configured to hold the portable electronic device;
    b) a spool mounted on an outer face of the case body;
    c) a cord affixed to the spool, the cord being extendible from the spool and retractable onto the spool, the cord being lockable against retraction in an extended position, the cord being attachable to an object separate from the security case and the portable electronic device;
    d) a spool cover extending outwardly from the outer face of the case body and extending over the spool; and
    e) a pair of projections extending outwardly from the outer face of the case body and extending radially outwardly from the spool cover, the projections having the same height as the spool cover so that the security case lies horizontally when laid on the spool cover.

12. A security case according to claim 11, wherein the portable electronic device is a mobile phone.

13. A security case according to claim 11, wherein the portable electronic device is one of a tablet computer and a personal entertainment device.

14. A security case for a portable electronic device, comprising:
    a) a case body;
    b) means for detachably affixing the case body to the portable electronic device;
    c) a spool assembly mounted on an outer face of the case body, comprising:
        (i) a spool with a cord attached thereto, the spool being rotatable between a first position in which the cord is wound onto the spool and a second position in which the cord extends at least partly from the spool;
        (ii) means for biasing the spool to the first position;
        (iii) means for locking the spool against rotation into the first position;
        (iv) means for releasing the spool from the second position; and
    d) means for forming a loop of the cord for attachment to an object;
    e) a spool assembly cover extending outwardly from the outer face of the case body and extending over the spool assembly; and f) a pair of projections extending outwardly from the outer face of the case body and extending radially outwardly from the spool assembly cover, the projections having the same height as the spool assembly cover so that the security case lies horizontally when laid on the spool assembly cover.

15. A security case according to claim 14, wherein the portable electronic device is a mobile phone.

16. A security case according to claim 14, wherein the portable electronic device is one of a tablet computer and a personal entertainment device.

17. A security case according to claim 14, where the object is one of an article of clothing, an article of furniture, a purse and a carrying bag.

* * * * *